United States Patent Office 2,706,193
Patented Apr. 12, 1955

2,706,193

MEROCYANINE DYES AND METHOD OF MAKING THEM

Robert H. Sprague, Portland, Conn., assignor to Eastman Kodak Company, Rochester, N. Y., a corporation of New Jersey No Drawing. Application November 22, 1952, Serial No. 322,159

6 Claims. (Cl. 260—240.4)

This invention relates to new merocyanine, styryl and cinnamylidene dyes and to photographic elements comprising these new dyes.

This application is a continuation-in-part of my application Serial No. 47,547, filed September 2, 1948, now U. S. Patent 2,622,082, issued December 16, 1952.

It is known that photographic elements are required, for many purposes, to have light-screening substances incorporated therein. Such a light-screening substance may be in a layer overlying a light-sensitive emulsion or overlying two or more light-sensitive emulsions; or it may be in a light-sensitive emulsion for the purpose of modifying a light record in such emulsion or of protecting an underlying light-sensitive emulsion or emulsions from the action of light of wave length absorbed by such light-screening substance; or it may be in a layer not containing a light-sensitive substance but arranged between two light-sensitive emulsions; or it may be in a layer serving as a backing on an element having one or more light-sensitive emulsions (for example, to reduce halation).

Numerous substances have been previously employed as light-screening substances for the purposes indicated above. Many of these have been found to be lacking in some of the properties which are essential to successful use of dyes for photographic filters or antihalation layers. Such dyes must have good spectral absorption properties, and in addition should bleach out readily in photographic processing baths with little or no stain remaining as a residue from the bleaching-out process. Such dyes should not wander and should be readily dispersible in the coating medium, such as gelatin.

I have now found new merocyanine, styryl and cinnamylidene dyes which provide an improvement over some of the dyes heretofore used. My new dyes do not wander and can be readily bleached out in photographic processing baths.

It is, therefore, an object of my invention to provide new merocyanine, styryl and cinnamylidene dyes. A further object is to provide methods for preparing such dyes. A still further object is to provide photographic elements comprising these dyes. Other objects will become apparent from a consideration of the following description and examples.

According to my invention, I prepare my new styryl and cinnamylidene dyes by condensing in the presence of a substantially anhydrous acid a pyrrocoline (i. e. an indolizine) selected from those represented by the following general formula:

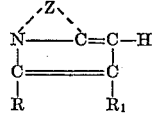

wherein R and $R_1$ each represents a member selected from the group consisting of a hydrogen atom, an alkyl group, e. g. methyl, ethyl, propyl, butyl, etc., and an aryl group, e. g. a phenyl group, p-carboxyphenyl, etc., and Z represents the non-metallic atoms necessary to complete a heterocyclic nucleus of a member selected from the group consisting of the pyridine series and the isoquinoline series, with an aldehyde selected from those represented by the following general formula:

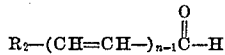

wherein $R_2$ represents an aryl group of the benzene series, e. g. a group represented by the following formula:

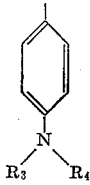

wherein $R_3$ and $R_4$ each represents an alkyl group, such as a methyl group, an ethyl group, etc. (e. g., an alkyl group containing from 1 to 2 carbon atoms), and $n$ represents a positive integer from 1 to 2. Typical aldehydes include p-dimethylaminobenzaldehyde, p-diethylaminobenzaldehyde, p-ethylmethylaminobenzaldehyde, p-dimethylaminocinnamaldehyde, etc.

As substantially anhydrous acids, glacial acetic acid and hydrogen chloride are advantageously employed. Substantially anhydrous propionic, n-butyric, and iso-butyric acids, hydrogen bromide, hydrogen iodide, etc., can also be employed, though usually less advantageously. Where the dye formed does not readily precipitate from the reaction mixture, especially in the case of the dye-chloride and the dye-acetate, it can be precipitated by the addition of a metal salt (e. g., an alkali metal salt), such as sodium perchlorate, potassium perchlorate, sodium iodide, potassium iodide, etc. The metal salt (e. g., sodium perchlorate, etc.) can alternatively be added to the reaction mixture prior to or during the condensation of the pyrrocoline with the aldehyde, whereupon the dye precipitates from the cooled reaction mixture. A substantially anhydrous alcohol (e. g., absolute ethyl alcohol) is advantageously employed as a solvent when a hydrohalogen acid is employed. When a substantially anhydrous carboxylic acid is employed, there is generally no advantage in the use of an additional solvent, since such acids as acetic acid provide a convenient medium in which the condensation can be carried out.

The new merocyanine dyes of my invention can advantageously be prepared by condensing, usually, in the presence of a basic condensing agent, a pyrrocoline selected from those represented by the formula:

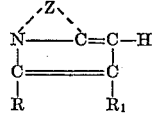

wherein R, $R_1$ and Z have the values given above, with a compound selected from those represented by the formula:

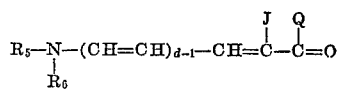

wherein $R_5$ represents a member selected from the group consisting of a hydrogen atom and an acyl group of a carboxylic acid, e. g. acetyl, propionyl, n-butyryl, etc., $R_6$ represents an aryl group, e. g. a phenyl group, a naphthyl group, etc., J represents a member selected from the group consisting of a cyano group, a carboxyl group, a carbalkoxyl group (e. g. a carbomethoxyl group or a carbethoxyl group), an acyl group of a carboxylic acid (e. g. acetyl, propionyl, etc.), a carbamyl group and a heterocyclic nucleus of the quinoline series (e. g. a 2- or 4-quinolyl group), Q represents a member selected from the group consisting of a hydroxyl group, an alkyl group (e. g. a methyl group or an ethyl group), an aryl group (e. g. a phenyl group, an o- or p-tolyl group), an amino group (e. g. a —$NH_2$ group, an anilino group, etc.), a carbalkoxyl group, (e. g. a carbomethoxyl group or a carbethoxyl group), an alkoxyl group (e. g. a methoxyl group, an ethoxyl group, etc.) and a heterocyclic nucleus of the benzofuran series (e. g. a 2-benzofuryl group) and J and Q together represent the non-metallic atoms necessary to complete a heterocyclic nucleus containing from 5 to 6 atoms in the heterocyclic ring, e. g. a heterocyclic nucleus of the rhodanine series (e. g. 3-ethylrhodanine, 3 - phenylrhodanine, 3-β-hydroxyethylrhodanine, etc.), a heterocyclic nucleus of the 2-thio-2,4(3,5)-oxazoledione series (e. g. 3-ethyl-2-thio-2,4(3,5)-oxazoledione, etc.), a heterocyclic nucleus of the 2-thiohydantoin series (e. g. 1-ethyl-3-phenyl-2-thiohydantoin, 1,3-diphenyl-2-thiohydantoin, etc.), a heterocyclic nucleus of the 5-pyrazolone series (e. g. 1-carboxyphenyl-3-methyl-5 - pyrazolone, 1 - carboxyphenyl-3-pentadecyl-5-pyrazolone, etc.), a heterocyclic nucleus of the barbituric acid series (e. g. a 1,3-dialkylbarbituric acid), a heterocyclic nucleus of the thiobarbituric acid series (e. g. a 1,3-dialkyl-2-thiobarbituric acid), etc., and $d$ represents a positive integer from 1 to 3. Compounds of the type represented by the above formula wherein $d$ equals 1 have been previously described by Dains at al. See, for example, "Journal of the American Chemical Society," vol. 31 (1909), p. 1148; vol. 35 (1913), p. 959; vol. 38 (1916), p. 1841; vol. 40 (1918), p. 562; vol. 44 (1922), p. 2310; and "Berichte," vol. 35 (1902), p. 2496. The compounds wherein $d$ equals 2 and 3 can be prepared as described in United States Patent 2,165,339 dated July 11, 1939, or in United States Patent 2,186,608 dated January 9, 1940.

Typical basic condensing agents include pyridine, quinoline, α-picoline, triethylamine, N-ethylpiperidine (i. e., organic tertiary amines), etc. The basic condensing agent can be used in the presence of an inert solvent, if desired.

The following examples will serve to illustrate further the manner whereby I practice my invention.

*Example I.*—1 - p - dimethylaminocinnamylidene - 2,3-diphenylpyrrocolinium perchlorate

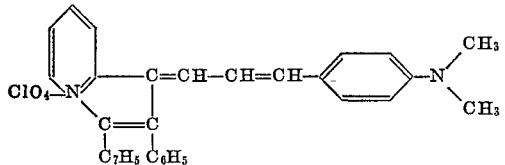

1.23 g. (1 mol.) of 2,3-diphenylpyrrocoline, 0.9 g. (1 mol.) of p-dimethylaminocinnamaldehyde, 0.8 g. (1 mol.+excess) of sodium perchlorate and 25 cc. of glacial acetic acid were boiled together under reflux for five minutes. The blue reaction mixture was cooled to room temperature, diluted with 125 cc. of water, and the dye which precipitated was collected on a filter. The dye was washed on the filter with distilled water and 10 cc. of methyl alcohol and then dried. The crude dye was obtained as a blue solid and amounted to 2.6 g. (99 per cent yield). The dye was purified by recrystallization from methyl alcohol (780 cc. per gram of dye) to give a product in the form of green crystals with a golden metallic reflex melting at 253°–254° C. with decomposition. The yield of pure dye amounted to 1.7 g. (65 per cent yield). Its solutions in methyl alcohol were blue in color. This color was removed by the usual sulfite photographic developers.

By replacing the p-dimethylaminocinnamaldehyde in the above example by a molecularly equivalent amount of p-dimethylaminobenzaldehyde, the dye represented by the formula:

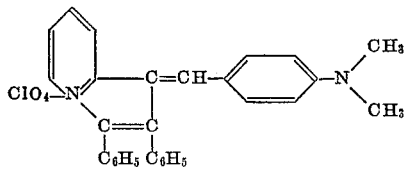

can be obtained. In a like manner, by replacing the 2,3-diphenylpyrrocoline by a molecularly equivalent amount of 2-phenylpyrrocoline, the dye represented by the formula:

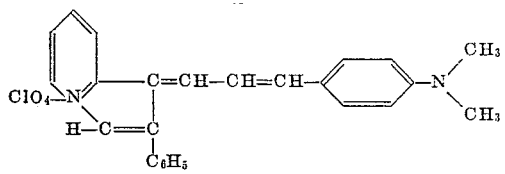

can be obtained.

*Example II.*—1-p-dimethylaminobenzylidene - 2 - phenyl-7,8-benzopyrrolinium perchlorate

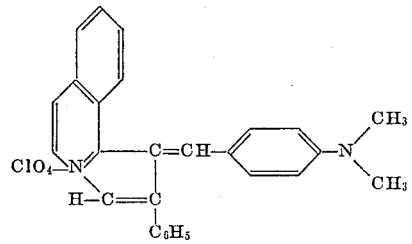

2.4 g. (1 mol.) of 2-phenyl-7,8-benzopyrrocoline, 1.5 g. (1 mol.) of p-dimethylaminobenzaldehyde, 1.3 g. (1 mol.) of sodium perchlorate and 25 cc. of glacial acetic acid were boiled together under reflux for five minutes. The blue reaction mixture was chilled and the dye which separated was collected on a filter with the aid of suction. The dye was washed with acetic acid and water and then dried. The crude dye so obtained was dark blue in color and weighed 2.2 g. (46 per cent yield). It was recrystallized from glacial acetic acid (75 cc. per gram of dye) to give 1 g. of product melting at 145°–147° C. with decomposition. The pure dye dissolved in acetone to give a blue solution, which was bleached by the usual sulfite photographic developers.

*Example III.*—1 - p - dimethylaminocinnamylidene - 2-phenyl-7,8-benzopyrrocolinium perchlorate

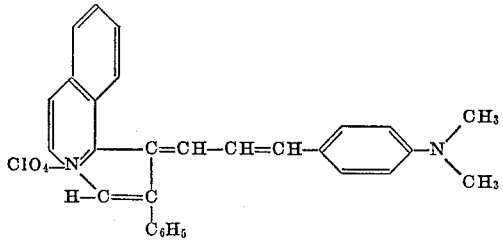

2.4 g. (1 mol.) of 2-phenyl-7,8-benzopyrrocoline, 1.75 g. (1 mol.) of p-dimethylaminocinnamaldehyde, 1.3 g. (1 mol.) of sodium perchlorate and 25 cc. of glacial acetic acid were boiled together under reflux for five minutes. The reaction mixture was chilled, and the product which separated was collected on a filter with the aid of suction. The crude product was washed with acetic acid and distilled water and then dried. There were thus obtained 4.1 g. (82 per cent yield) of dye in the form of green crystals. It was purified by recrystallization from glacial acetic acid (78 cc. per gram of dye) to give 2.6 g. of pure dye melting at 225°–228° C. with decomposition. The dye dissolved in acetone to give a blue solution, which was bleached by the usual sulfite photographic developers.

*Example IV.*— 1-p-dimethylaminobenzylidene-2-phenyl-6,7-benzopyrrocolinium perchlorate

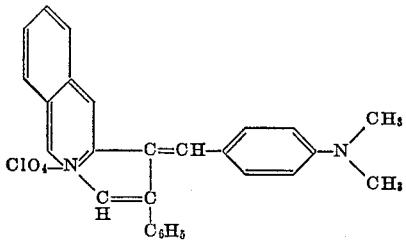

2.4 g. (1 mol.) of 2-phenyl-6,7-benzopyrrocoline, 1.5 g. (1 mol.) of p-dimethylaminobenzaldehyde, 15 cc. (excess) of a 10 per cent solution of hydrogen chloride in absolute ethyl alcohol and 25 cc. of absolute ethyl alcohol were boiled together under reflux for one hour. The dye was precipitated as the perchlorate by pouring the purple reaction mixture into a dilute aqueous sodium perchlorate solution. The precipitate of dull red crystals amounted to 2.2 g. (46 per cent yield). The dye was purified by recrystallization from absolute ethyl alcohol (150 cc. per gram of dye) to give 1.0 g. of a dark product melting at 142°–144° C. with decomposition. It dissolved in absolute ethyl alcohol to give a magenta solution, which was bleached by the usual sulfite photographic developers.

When a molecularly equivalent amount of p-dimethylaminocinnamaldehyde replaces the p-dimethylaminobenzaldehyde in the above example, 1-p-dimethylaminocinnamylidene-2-phenyl-6,7-benzopyrrocolinium perchlorate represented by the following formula:

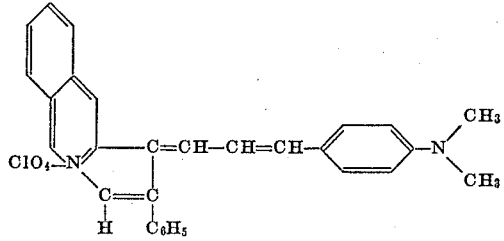

can be obtained. When 2.4 g. (1 mol.) of 2-phenyl-6,7-benzopyrrocoline is reacted with 1.5 g. (1 mol.) of p-dimethylaminobenzaldehyde in the presence of a 10 per cent solution of hydrogen iodide in absolute ethyl alcohol and 25 cc. of absolute ethyl alcohol as a solvent, the dye iodide represented by the formula:

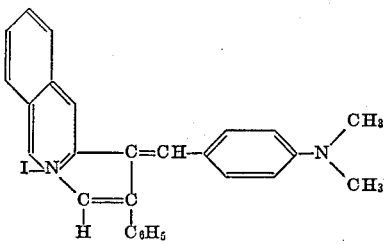

can be obtained.

*Example V.*—*5 - [5 - (2 - p - carboxyphenyl - 3 - methyl-1-pyrrocolyl) - 2,4 - pentadienylidene] - 1,3 - diethyl-2-thiobarbituric acid*

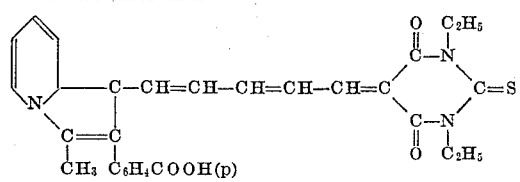

2 g. (1 mol.) of 5-(5-acetanilido-2,4-pentadienylidene)-1,3-diethyl-2-thiobarbituric acid, 1.25 g. (1 mol.) of 2-p-carboxyphenyl-3-methylpyrrocoline and 25 cc. of pyridine were boiled together under reflux for five minutes. The blue reaction mixture was cooled to room temperature, diluted with 25 cc. of methyl alcohol and chilled to 0° C. The product which precipitated was collected on a suction filter, washed on the filter with 25 cc. of methyl alcohol and 25 cc. of water and dried. The resulting product was in the form of green crystals and amounted to 1.9 gms. (74 per cent yield). It was purified by dissolving in 200 cc. of methyl alcohol containing 2 cc. of triethylamine, filtering the solution and precipitating the dye by adding 10 cc. of glacial acetic acid. The purified dye was obtained in the form of a dark green solid which melted at 242°–245° C. with decomposition, and amounted to 1.5 g. It dissolved in methyl alcohol to give a blue solution which was bleached by the usual sulfite developers.

When a molecularly equivalent amount of 5-(3-acetanilidoallylidene)-1,3-diethylbarbituric acid replaces the 5 - (5 - acetanilido - 2,4 - pentadienylidene) - 1,3 - diethyl-2-thiobarbituric acid in the above example, 5-[3-(2-p-carboxyphenyl - 3 - methyl - 1 - pyrrocolyl)allylidene]-1,3-diethylbarbituric acid, represented by the formula:

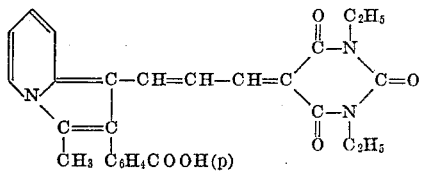

can be obtained.

The dye-bromides, dye-chlorides, dye-thiocyanates or dye-acetates can be prepared from the dye-iodides by refluxing a suspension of the silver salt of the desired anion with the dye-iodides, the insoluble silver iodide precipitating out from the reaction mixture.

*Example VI.*—*1,3 - diethyl - 5 - [3 - (2,3 - dimethyl - 1 - pyrrocolyl)allylidene]-2-thiobarbituric acid*

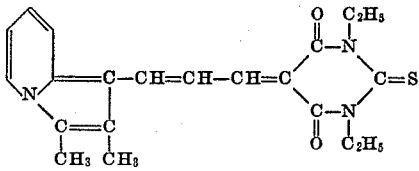

A mixture of 1.45 g. (1 mol.) of 2,3-dimethylpyrrocoline and 3.73 g. (1 mol.) of 5-(3-acetanilidoallylidene)-1,3-diethyl-2-thiobarbituric acid in 25 cc. of pyridine was heated at the refluxing temperature, with shaking, for one minute. The reaction mixture was cooled, diluted with methyl alcohol and chilled. The solid was collected on a filter and washed with methyl alcohol. The dye was purified by dissolving it in hot pyridine, filtering the solution, and adding methyl alcohol to the filtrate. The yield of dye after two such treatments, was 66% and the dark needles had melting point 260–262° C. with decomposition.

*Example VII.*—*2-[3-(2-methyl-1-pyrrocolyl)allylidene]-cyanoacetylbenzofuran*

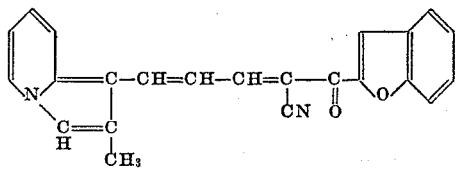

A mixture of 1.0 g. (1 mol.) of 2-methylpyrrocoline and 2.6 g. (1 mol.) of 2-(3-acetanilidoallylidene)cyanoacetylbenzofuran in 25 cc. of pyridine was heated at the refluxing temperature, with shaking, for one minute. The reaction mixture was cooled, diluted to 300 cc. with methyl alcohol and chilled. The solid was collected on a filter and washed with methyl alcohol. The dye was purified by dissolving it in hot pyridine, filtering the solution, and then adding methyl alcohol to the filtrate. The yield of dye, after two such treatments, was 34% and the dark needles had melting point 189–191° C. with decomposition.

The yield of purified 2-[3-(2,3-dimethyl-1-pyrrocolyl)-allylidene]cyanoacetylbenzofuran, prepared as above by using 2,3-dimethylpyrrocoline in place of 2-methylpyrrocoline, was 71% and the bright green needles had melting point 202–203° C. with decomposition.

*Example VIII.*—*2 - [3 - (2 - phenyl - 1 - pyrrocolyl)allylidene]cyanoacetylbenzofuran*

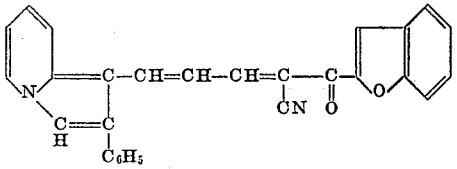

A mixture of 1.93 g. (1 mol.) of 2-phenylpyrrocoline and 3.42 g. (1 mol.) of 2-(3-acetanilidoallylidene)cyanoacetylbenzofuran in 50 cc. of absolute ethyl alcohol containing 1.0 g. (1 mol.) of triethylamine was heated at the refluxing temperature, with shaking, for 15 minutes. The purplish reaction mixture was chilled, the solid was collected on a filter and washed first with methyl alcohol and then with water. The solid was transferred to a beaker, stirred with hot acetone and the suspension was filtered. The dye was purified by dissolving it in hot pyridine, filtering the solution, and adding methyl alcohol to the filtrate. The yield of dye, after two such treatments, was 22% and the dark crystals had melting point 227–230° C. with decomposition.

*Example IX.—1,3 - diethyl - 5 - [5 - (2,3 - dimethyl - 1 - pyrrocolyl) - 2,4 - pentadienylidene] - 2 - thiobarbituric acid*

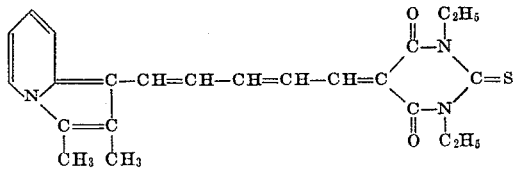

A mixture of 1.45 g. (1 mol.) of 2,3-dimethylpyrrocoline and 4.0 g. (1 mol.) of 5-(5-acetanilido-2,4-pentadienylidene)-1,3-diethyl-2-thiobarbituric acid in 25 cc. of pyridine was heated at the refluxing temperature, with shaking, for one minute. The blue reaction mixture was cooled, diluted to 300 cc. with methyl alcohol and chilled. The solid was collected on a filter and washed with methyl alcohol. The dye was purified by dissolving it in hot pyridine, filtering the hot solution, and then adding methyl alcohol to the filtrate. The yield of dye, after two such treatments, was 58% and the minute dark green needles with a golden reflex had melting point 229–232° C. with decomposition.

The yield of 1,3-diethyl-5-[5-(2-methyl-1-pyrrocolyl)-2,4-pendadienylidene]-2-thiobarbituric acid, prepared as above using 2-methylpyrrocoline in place of 2,3-dimethylpyrrocoline, was 51% and the violet solid decomposed from about 225° C.

*Example X.—1,3 - diethyl-5-[5-(2-phenyl-1-pyrrocolyl)-2,4-pentadienylidene]-2-thiobarbituric acid*

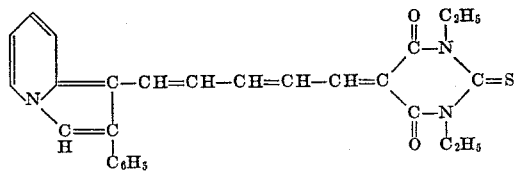

A mixture of 1.93 g. (1 mol.) of 2-phenylpyrrocoline and 4.0 g. (1 mol.) of 5-(5-acetanilido-2,4-pentadienylidene)-1,3-diethyl-2-thiobarbituric acid in 40 cc. of glacial acetic acid was heated at the refluxing temperature for 10 minutes. The blue reaction mixture was chilled, the solid was collected on a filter and washed first with acetic acid and then water. The dried residue was stirred with 250 cc. of hot pyridine, the suspension was filtered and 550 cc. of methyl alcohol was added to the pyridine filtrate. After chilling, the product was collected on a filter and given another purification as above. The yield of dye was 15% and the dull blue crystals had melting point above 330° C.

*Example XI.—2-[5-(2,3-dimethyl - 1 - pyrrocolyl)-2,4-pentadienylidene] cyanoacetylbenzofuran*

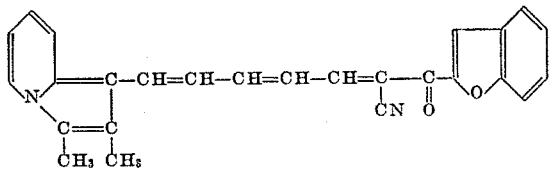

A mixture of 1.45 g. (1 mol.) of 2,3-dimethylpyrrocoline and 2.82 g. (1 mol.) of 2-(5-acetanilido-2,4-pentadienylidene)-cyanoacetylbenzofuran in 25 cc. of pyridine was heated at the refluxing temperature, with shaking, for one minute. The blue reaction mixture was cooled, diluted with methyl alcohol and chilled. The solid was collected on a filter and washed with methyl alcohol. The dye was purified by dissolving it in hot pyridine, filtering the solution and then adding methyl alcohol to the filtrate. The yield of dye was 87% crude and 70% after two such purifications. The minute green needles had melting point 235–237° C. with decomposition.

*Example XII.—2-[5-(2-phenyl-1-pyrrocolyl)-2,4-pentadienylidene] cyanoacetylbenzofuran*

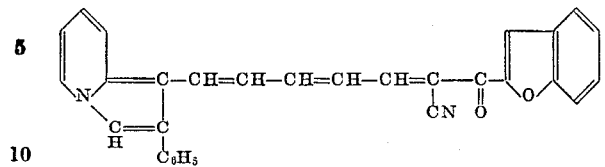

A mixture of 1.93 g. (1 mol.) of 2-phenylpyrrocoline and 3.8 g. (1 mol.) of 2-(5-acetanilido-2,4-pentadienylidene)-cyanoacetylbenzofuran in 50 cc. of absolute ethyl alcohol containing 1.0 g. (1 mol.) of triethylamine was heated at the refluxing temperature for 15 minutes. The blue reaction mixture was chilled, the solid was collected on a filter and washed first with methyl alcohol and then with water. The product was extracted with two portions (100 cc. each) of hot acetone. The yield was 36% crude and 23% after two purifications which consisted in dissolving the dye in hot pyridine and then adding methyl alcohol to the pyridine filtrate. The blue powder had melting point above 325° C.

*Example XIII.—1-(p-carboxyphenyl)-4-[5-(2,3-dimethyl-1 - pyrrocolyl)-2,4-pentadienylidene] - 3 - pentadecyl-5-pyrazolone*

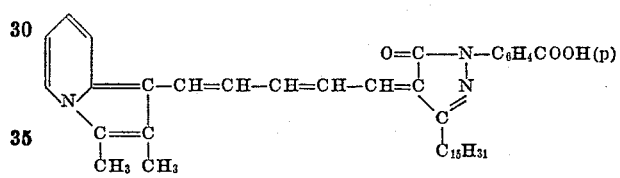

A mixture of 1.1 g. (1 mol.) of 2,3-dimethylpyrrocoline and 4.5 g. (1 mol.) of 4-(5-acetanilido-2,4-pentadienylidene)-1-(p-carboxyphenyl)-3-pentadecyl-5-pyrazolone in 25 cc. of acetic acid was heated at the refluxing temperature, with shaking, for five minutes. The blue reaction mixture was chilled, the solid was collected on a filter and washed first with acetic acid and then methyl alcohol. The yield was 51% crude and 28% after two recrystallizations from acetic acid. The dull dark-bluish product had melting point 192–194° C. with decomposition.

Several of the pyrrocolines employed in practicing my invention are known compounds. Several of these pyrrocolines can be prepared by heating an α-methyl cyclammonium quaternary salt selected from those represented by the following general formula:

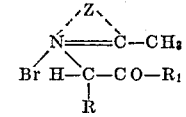

wherein R, R₁ and Z have the definitions designated above, in the presence of an acid-binding agent, e. g., an alkali metal carbonate (e g., sodium or potassium carbonate). The α-methyl cyclammonium quaternary salt can be formed by heating an α-methylpyridine (e. g., α-picoline, etc.) or a methylisoquinoline containing a methyl group in a reactive position (e. g., 1-methylisoquinoline, 3-methylisoquinoline, etc.) with the appropriate α-bromoketone, e. g., phenacyl bromide (ω-bromoacetophenone), desyl bromide, etc. The following examples will serve to illustrate further the preparation of pyrrocoline bases by the aforesaid method.

*Example XIV.—2,3-diphenylpyrrocoline*

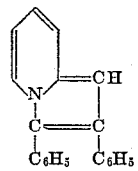

A hot solution of 17.5 g. of sodium carbonate in 1 liter of water was added, with stirring, to a hot solution of 50.2 g. of α-picoline desobromide in 1500 cc. of water.

The reaction mixture was kept at 95° C. for one hour, then it was chilled and the product was collected on a filter and washed with water. The 2,3-diphenylpyrrocoline was recrystallized from 100 cc. of acetone. The light gray crystals weighed 28 g.

The α-picoline desobromide used in the above example was prepared as follows:

50 g. of α-picoline and 91.7 g. of desyl bromide were heated together at 125° C. for one hour. The cake of quaternary salt was ground to a fine crystalline mass. The colorless crystals, after being washed on the filter with acetone, weighed 65.5 g.

*Example XV.—2-p-carboxyphenyl-3-methylpyrrocoline*

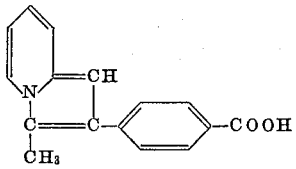

6.1 g. of 2-p-cyanophenyl-3-methylpyrrocoline was heated with 30 cc. of concentrated hydrochloric acid in a sealed tube at 135° C. for 16 hours. The solution was decanted from a small amount of tarry material and it was diluted with 600 cc of cold water. The solid was collected on a filter, dissolved in dilute sodium carbonate solution an reprecipitated with acetic acid. The yield of gray crystals was 4.7 g.

The 2-p-cyanophenyl-3-methylpyrrocoline employed above was prepared as follows:

A solution of 5.0 g. of sodium carbonate in 100 cc. of water was added to 10.0 g. of α-picoline p-cyano-α-methylphenacobromide in 600 cc of water and the reaction mixture was heated at the boiling point, with stirring, for 10 minutes. The light colored crystals were collected on a filter and washed with water. The intermediate, thus obtained, weighed 6.6 g., had melting point 181–183° C. and it was used without further purification.

The α-picoline p-cyano-α-methylphenacobromide employed above was prepared as follows:

10 cc. of α-picoline and 11.0 g. of α-bromo-p-cyanopropiophenone were heated together at the temperature of the steam bath for 15 minutes. At first, a clear solution was obtained, then solid separated, and the reaction mixture began to darken. Chloroform (25 cc.) was added and the reaction mixture was allowed to stand overnight at room temperature. The quaternary salt was collected on a filter and washed with acetone. The pale greenish crystals weighed 10.6 g.

The α-bromo-p-cyanopropiophenone employed above was prepared as follows:

13.1 g. of p-cyanopropiophenone and 300 cc. of anhydrous ether were placed in a 500 cc. three-necked flask, fitted with a stirrer, reflux condenser and dropping funnel. After chilling the solution in an ice-bath, 0.2 g. of anhydrous aluminum chloride was added and then 13.2 g. of bromine was added slowly from the dropping funnel. After stirring for 10 minutes, the ether was removed under reduced pressure. The crystalline residue was transferred to a funnel and washed first with 50 cc. of water and then 50 cc. of petroleum ether. The product was recrystallized from 300 cc. of ligroin (boiling point 90–120° C.). The nearly colorless crystals weighed 11.6 g. and had melting point 60–61° C.

The p-cyanopropiophenone employed above was prepared as follows:

A solution containing 125 g. of crystallized copper sulfate and 32.5 g. of sodium chloride in 400 cc. of hot water was placed in a 2-liter flask fitted with a stirrer. To this solution was added, over a period of 10 minutes, an alkaline solution of sodium sulfite (26.5 g. of sodium bisulfite and 17.5 g. of sodium hydroxide in 300 cc. of water). The mixture was allowed to cool to room temperature and the white cuprous chloride was washed by decantation with cold water. To the suspension of cuprous chloride in 300 cc. of water was added, with stirring, a solution of 65 g. of sodium cyanide in 150 cc. of water. The cuprous chloride went into solution with the evolution of considerable heat and then the mixture was cooled in a cold water bath. In a 5-liter three-necked flask, fitted with a stirrer and dropping funnel, was placed 58 g. of p-aminopropiophenone, 100 cc. of concentrated hydrochloric acid, 500 cc. of water and enough ice to lower the temperature of the mixture to 0° C. The suspension of p-aminopropiophenone hydrochloride was stood in an ice-bath and a solution of 28 g. of sodium nitrite in 100 cc. of water was added, with stirring, at such a rate the temperature of the reaction mixture was kept at 0° to 5° C. A distinct and permanent reaction for free nitrous acid was given with starch-iodide paper. The mixture was cautiously neutralized by adding, with stirring, anhydrous sodium carbonate. Litmus paper was used to determine the endpoint. The suspension of cuprous cyanide and 500 cc. of benzene were placed in a 3-liter three-necked flask. The flask was placed in an ice-bath. The cold neutralized suspension of the diazonium salt was added slowly, with stirring, to the cold (0° to 5° C.) suspension of cuprous cyanide and then the stirring was continued for 30 minutes. The reaction mixture was heated at 60° C. and then it was allowed to stand about 65 hours at room temperature. The benzene layer was collected, and the reaction mixture was extracted twice with benzene (500 cc. each time). The benzene extracts were heated to the boiling point, filtered, and the combined filtrates were fractionated. The fraction distilling at 160–162° C./8 mm. solidified as nearly colorless crystals. The yield of p-cyanopropiophenone was 13.1 g.

*Example XVI.—2-phenyl-7,8-benzopyrrocoline*

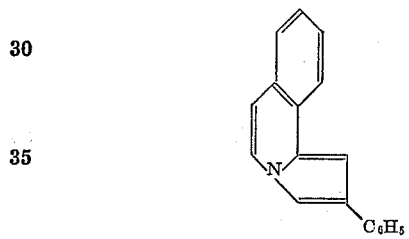

A solution of 13.7 g. (1 mol.) of sodium carbonate in 200 cc. of water was added rapidly to a warm (60° C.) solution of 44.0 g. (1 mol.) of 1-methylisoquinoline phenacobromide with stirring. A precipitate was formed at once and stirring was continued for 10 minutes, during which time the temperature was gradually increased to 75° C. After chilling, the product was collected on a filter and washed with water. The light tan crystals weighed 27.9 g.

The 1-methylisoquinoline phenacobromide was prepared by heating a mixture of 28.6 g. (1 mol.) of 1-methylisoquinoline and 39.8 g. (1 mol.) of phenacyl bromide together in 150 cc. of chloroform at the refluxing temperature for 3 hours. After removing about one-half of the chloroform, by distillation, the residue was poured, with stirring, into 200 cc. of acetone. After chilling, the product was collected on a filter and washed with acetone. The colorless crystals weighed 45.0 g.

*Example XVII.—2-phenyl-6,7-benzopyrrocoline*

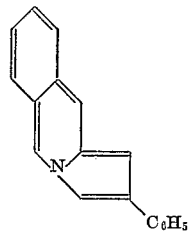

A solution of 18.0 g. (1 mol.) of sodium carbonate in 200 cc. of water was added rapidly to a warm (60° C.) solution of 58.0 g. (1 mol.) of 3-methylisoquinoline phenacobromide with stirring. A precipitate was formed at once and stirring was continued for 10 minutes, during which time the temperature was gradually increased to 75° C. After chilling, the product was collected on a filter and washed with water. The orange crystals weighed 40.0 g.

The 3-methylisoquinoline phenacobromide was prepared by heating 28.6 g. (1 mol.) of 3-methylisoquinoline and 39.8 g. (1 mol.) of phenacyl bromide together in an oil-bath having a temperature of 120° C. for 10 minutes. The cake of crystals was ground to a fine mass under acetone; they were collected on a filter and washed with acetone. The light tan crystals weighed 59.0 g.

For the preparation of overcoating layers, filter layers and antihalation layers, according to my invention, from 50 mg. to 150 mg. of dye are dissolved in from 2 ot 5 cc. of a water-miscible solvent. Methanol, or acetone, is suitable for this purpose, but pyridine or b-ethoxyethanol can also be used. The solution is then added to about 25 cc. of a 5 per cent gelatin solution at 40° C. and the mixture coated on the support.

The condensations leading to the formation of my new merocyanine dyes can also be carried out in the absence of a basic condensing agent as shown in several of the above examples. In some instances, it is advantageous to employ an acidic solvent, e. g. acetic acid, propionic acid, etc., as shown in Examples X and XIII above.

What I claim as my invention and desire secured by Letters Patent of the United States is:

1. The pyrrocoline dye having the following formula:

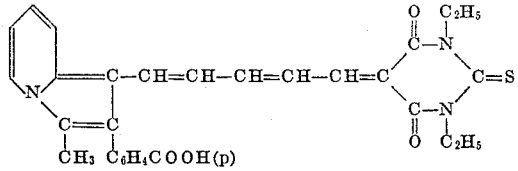

2. The pyrrocoline dye having the following formula:

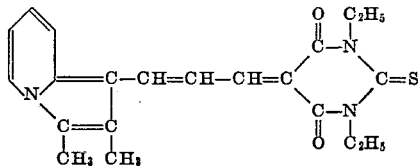

3. The pyrrocoline dye having the following formula:

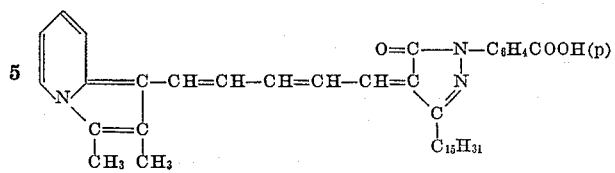

4. A process for preparing a pyrrocoline dye comprising condensing, in the presence of a basic condensing agent, 2-p-carboxyphenyl-3-methylpyrrocoline together with 5 - (5-acetanilido-2,4-pentadienylidine)-1,3-diethyl-2-thiobarbituric acid.

5. A process for preparing a pyrrocoline dye comprising condensing, in the presence of a basic condensing agent, 2,3-dimethylpyrrocoline together with 5-(3-acetanilidoallylidene)-1,3-diethyl-2-thiobarbituric acid.

6. A process for preparing a pyrrocoline dye comprising condensing, in the presence of acetic acid, 2,3-dimethylpyrrocoline together with 4-(5-acetanilido-2,4-pentadienylidene) - 1 - (p-carboxyphenyl)-3-pentadecyl-5-pyrazolone.

References Cited in the file of this patent

UNITED STATES PATENTS 2,494,031    Brooker _____ Jan. 10, 1950

FOREIGN PATENTS 529,440    Great Britain _____ 1940